June 25, 1935.  W. SCHAAKE  2,005,908

CURRENT COLLECTING EQUIPMENT

Filed Aug. 8, 1934  2 Sheets-Sheet 1

WITNESSES:

INVENTOR
William Schaake
BY
ATTORNEY

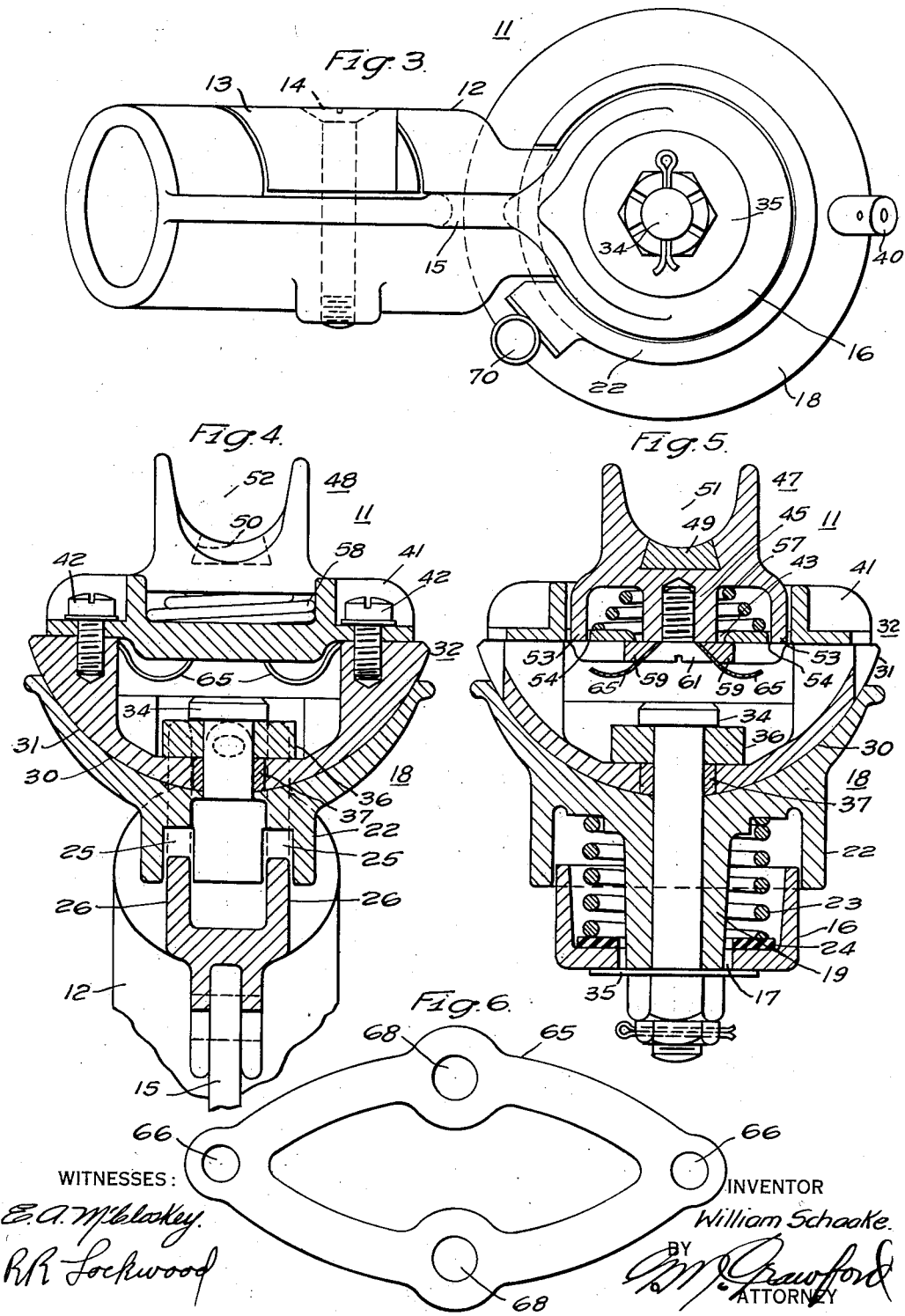

Patented June 25, 1935

2,005,908

UNITED STATES PATENT OFFICE 2,005,908

CURRENT COLLECTING EQUIPMENT

William Schaake, Pittsburgh, Pa., assignor to Westinghouse Electric & Manufacturing Company, East Pittsburgh, Pa., a corporation of Pennsylvania Application August 8, 1934, Serial No. 738,990

15 Claims. (Cl. 191—59.1)

My invention relates, generally, to current collecting devices and it has particular relation to devices for collecting current for operating electric vehicles.

Due to the demand for increased speed of operation of electric vehicles, it has been necessary to make improvements in the current collecting equipment in order to provide for satisfactorily collecting current from an overhead conductor for operating the vehicle at the high speeds. One difficulty which has existed heretofore, in current collecting equipment of the slider shoe type, has been the lack of sufficient flexibility to permit the current collecting equipment to remain in contact engagement with the trolley wire at the high speeds. It will be understood that the current collecting equipment of the prior art has the tendency to move out of engagement with the trolley wire when operating at high speeds due to irregularities in the construction and suspension of the overhead trolley conductor. Such action is particularly apparent when the current collector engages the trolley wire at a point of suspension thereof.

While I am aware that the prior art discloses certain forms of current collecting equipment, and in particular, shows slider shoes of the articulated type, the construction of the remainder of the equipment has not been such as to permit full advantage to be taken of the flexibility which is thus provided. The current collecting equipment of the prior art has not provided a satisfactory solution to the problems of current collection which are encountered when the vehicle for which current is being obtained is operated at high speeds.

The object of my invention, generally stated, is to provide current collecting equipment which shall be simple, efficient and flexible in operation, and which may be readily and economically manufactured and installed.

The principal object of my invention is to provide a high degree of flexibility in the operation of a pole head which is used for collecting current for an electric vehicle.

Other objects of my invention will, in part, be obvious and, in part, appear hereinafter.

My invention, accordingly, is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Fig. 3 is a bottom plan view of the current collector shown in Fig. 1;

Fig. 4 is a view of the current collector taken along the line IV—IV of Fig. 2;

Fig. 5 is a view taken along the line V—V of Fig. 2; and,

Fig. 6 is a top plan view of the flexible shunt which is used for connecting the slider shoes to the swivel.

In order to provide a high degree of flexibility in the construction of the current collector or pole head shown and described herein, I have provided a pair of slider shoes which are pivotally and slidably mounted on a swivel. The slider shoes are provided with the customary grooves for engaging an overhead conductor and are arranged to be biased away from the swivel by means of individual springs. The swivel is provided with a spherical bearing surface which is mounted on a corresponding bearing surface of a swivel cup that, in turn, is pivotally and slidably mounted on a pole head clamp. A main spring is interposed between the pole head clamp and the swivel cup in order to provide additional flexibility. Due to the high degree of flexibility which has been provided, at least one of the slider shoes will always remain in contact engagement with the trolley wire. Arcing at this point will thereby be reduced to a minimum and, in fact, it is unusual to observe any arcing under normal conditions of operation.

When the flexible construction of the pole head described herein is employed, the shock with which the current collector encounters suspension points, splicers and hard spots in the trolley wire will be reduced to a minimum. Further, due to the multiple shoe arrangement, the current collector will engage and leave these irregularities in the trolley wire gradually rather than abruptly as has been the practice in the prior art.

Figure 1:
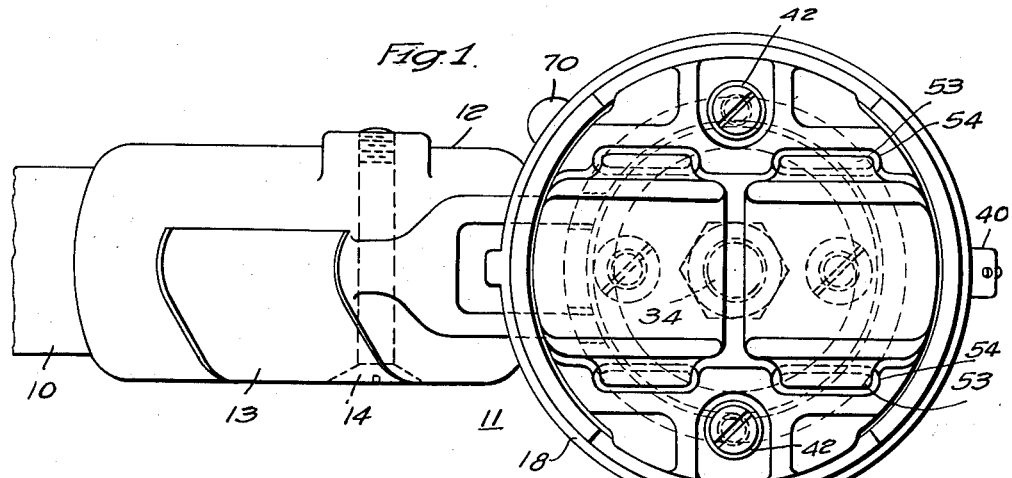
Figure 1 is a top plan view of a current collector constructed in accordance with my invention.
Figure 2:
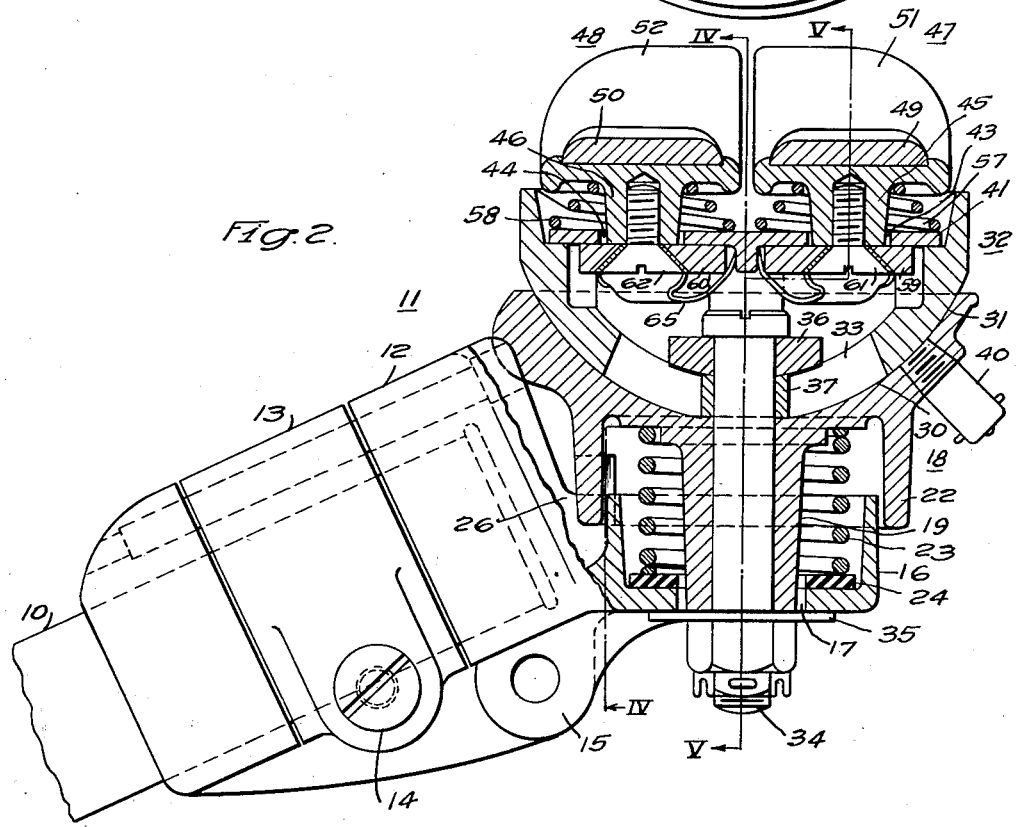
Fig. 2 is a view, partly in side elevation and partly in section, of the current collector shown in Fig. 1.

Referring now particularly to Figs. 1 and 2 of the drawings, the reference character 10 designates the upper end of a trolley pole, only a portion of which is shown and which, it will be understood, is arranged to be carried by an electric vehicle (not shown). In order to collect current from an overhead trolley conductor (not shown), a pole head shown generally at 11 is provided, which comprises a pole head clamp 12 that is arranged to be secured to the trolley pole 10 by means of a hinged clamping member 13. A bolt 14 is provided for securely holding the hinged clamp 13 in engagement with the trolley pole 10. The pole head clamp 12 is provided with an apertured boss 15 to which may be secured a retrieving line in the customary and well-known manner.

Integrally formed with the pole head clamp 12 is a support cup 16 having an opening 17 centrally located therein. It will be understood that the pole head clamp 12 and the support cup 16 may be cast integrally of some suitable material, preferably aluminum, so that the weight of the device may be reduced to a minimum.

A swivel cup, shown generally at 18, having a hollow depending spindle 19 integrally formed therewith is mounted, as illustrated, on the support cup 16, the hollow spindle 19 being positioned within the aperture 17 of the support cup 16. It will be observed that the swivel cup 18 is provided with a downwardly extending flange 22 which is arranged to surround the support cup 16.

Interposed between the swivel cup 18 and the support cup 16 is a main spring 23. A washer 24 of insulating material, such as rubber, is provided in the support cup 16 to insulate the lower end of the main spring 23 from the support cup 16.

In order to limit the rotation of the swivel cup 18 while permitting vertical movement thereof the flange 22 is provided with slots 25, Fig. 4, interfitting with connecting members 26 of the pole head clamp 12, the tongue 27, forming a part of the flange 22, being positioned therebetween.

The swivel cup 18 is provided with a concave spherical up-turned bearing surface 30 with which a corresponding convex spherical downturned bearing surface 31 of a swivel, shown generally at 32, is arranged to engage. The swivel 32 is provided, as illustrated, with a slotted opening 33 in the bottom thereof through which a bolt 34 extends. It will be observed that the bolt 34 also extends through the hollow spindle 19 and the opening 17 in the support cup 16. A washer 35 is provided in the lower end of the bolt 34 in order to prevent it from passing through the opening 17 in the support cup 16. It will be understood that the bolt 34 limits the upward movement of the swivel cup 18 and the swivel 32 as they are biased apart by means of the main spring 23.

Under the head of the bolt 34 a washer 36 is provided, the lower surface of which forms a part of a cylindrical surface which is arranged to engage a corresponding cylindrical surface located on the upper side of the swivel 32. It will be understood that the swivel 32 is free to move transversely as limited by the slot 33 and also that it is free to rotate about the bolt 34. In order to reduce the wear on the sides of the slot 33, a bushing 37 is provided around the bolt 34 and underneath the washer 36, as illustrated.

A lubricating device 40 of a standard type may be provided for permitting the application of a lubricant to the spherical bearing surfaces 30 and 31 of the swivel cup 18 and the swivel 32, respectively.

As is more clearly shown in Figs. 4 and 5 of the drawings, the swivel 32 has mounted thereon a swivel cover plate 41 which is secured thereto by means of screws 42. As shown, the cover plate 41 is provided with openings 43 and 44 through which integrally formed threaded bosses 45 and 46 of slider shoes 47 and 48, respectively, may project.

The slider shoes 47 and 48 may each be provided with cast inserts 49 and 50, respectively, located in the bottoms of the customary grooves 51 and 52 for engagement with the trolley wire conductor.

The slider shoes 47 and 48 are each provided with downwardly extending flanges 53, Fig. 5, which are positioned within suitable openings 54 in the swivel cover plate 41. The flanges 53 are provided in order to limit the pivotal movement of the slider shoes 47 and 48 while permitting them to move vertically as will be readily understood.

In order to bias the slider shoes 47 and 48 upwardly, shoe springs 57 and 58 are provided between the under surfaces of the respective slider shoes and the upper surface of the swivel cover plate 41. The shoe springs 57 and 58 are wound on a conical mandrel rather than on a cylindrical mandrel, in order to permit each succeeding turn to be included within the preceding turn, when compressed, thereby permitting a more efficient utilization of the limited space between the under surfaces of the slider shoes 47 and 48, and the upper surface of the swivel cover plate 41, and permitting the use of more powerful spring pressure.

In order to limit the upward movement of the slider shoes 47 and 48 as urged by the shoe springs 57 and 58, retaining washers 59 and 60 are provided and each is secured by means of screws 61 and 62 to the threaded bosses 45 and 46 of the slider shoes 47 and 48, respectively, as shown. The retaining washers 59 and 60 are arranged, as illustrated, to engage the under surface of the swivel cover plate 41.

It is desirable to electrically connect the slider shoes 47 and 48 directly to the swivel 32 in order to confine the conduction of current to a predetermined path. If such means were not provided, serious arcing would occur within the pole head 11 and a consequent deterioration of the parts would result. In order to provide for the desired connection a flexible shunt shown generally at 65, Fig. 6, is provided. The shunt 65 is somewhat elliptical in shape and is provided with openings 66 at the ends along what may be termed the major axis, and openings 68 along what may be termed the minor axis. The shunt 65 is preferably formed from several layers of very thin and flexible copper sheet in order to provide the required degree of flexibility and conductivity.

As shown in the drawings, the shunt 65 is provided to connect the slider shoes 47 and 48 to the swivel 32, the screws 42 being positioned in the openings 66 of the shunt 65 while the screws 61 and 62, associated with the slider shoes 47 and 48, respectively, are positioned in the openings 68.

Due to the fact that the main spring 23 causes the bearing surface 31 of the swivel 32 to be maintained in close contact engagement with the bearing surface 30 of the swivel cup 18, it is unnecessary to provide a shunt between these two members. Current for operating the vehicle, therefore, may be obtained from the swivel cup 18 and connection therefor is provided by means of a terminal 70, Fig. 3, which may be secured to the swivel cup 18 by any suitable means.

In the operation of the pole head 14, it will be observed that there will be a high degree of flexibility in the movement between the various parts. Due to the use of the main spring 23, it is unnecessary for the trolley pole 10 to more rapidly follow the slight irregularities in the conductor or track. Such action is further aided by means of the shoe springs 57 and 58 which permit the slider shoes 47 and 48 to follow even the slightest irregularities. In the operation of this current collector, I have found that at least one of the slider shoes 47 or 48 will always be maintained in engagement with the trolley wire, regardless of the irregularities which are encountered and, therefore, arcing and consequent wear of the conductor is reduced to a minimum. Due to the fact that the swivel cup 18 and the slider shoes 47 and 48 are permitted to have a slight pivotal movement, the flexibility of the pole head 14 is further increased, as will be readily understood.

Since certain further changes may be made in the above construction and different embodiments of the invention may be made without departing from the scope thereof, it is intended that all matter contained in the above description or shown in the accompanying drawings, shall be interpreted as illustrative, and not in a limiting sense.

I claim as my invention:

1. A current collector for electric vehicles comprising, in combination, a support member disposed to be carried by a trolley pole, a swivel cup provided with an upturned bearing surface and disposed to be carried by said support member, a swivel provided with a downturned bearing surface and mounted in said swivel cup with said bearing surfaces in engagement, and articulated sliding shoe means carried by said swivel and disposed to engage a conductor for collecting current therefrom.

2. A current collector for electric vehicles comprising, in combination, a support member disposed to be carried by a trolley pole, a swivel cup provided with an upturned bearing surface and disposed to be carried by said support member, a swivel provided with a downturned bearing surface and mounted in said swivel cup with said bearing surfaces in engagement, and a pair of independently movable slider shoes carried by said swivel and disposed to engage a conductor for collecting current therefrom.

3. A pole head for collecting current for an electric vehicle from a conductor comprising, in combination, a pole head support member disposed to be carried by a trolley pole, a swivel cup provided with a concave spherical upturned bearing surface and disposed to be carried by said support member, a swivel provided with a convex spherical downturned bearing surface and mounted in said swivel cup with said bearing surfaces in engagement, and a pair of independently movable slider shoes carried by said swivel and disposed to engage the conductor for collecting current therefrom.

4. A pole head for collecting current for an electric vehicle from a conductor comprising, in combination, a pole head support member disposed to be carried by a trolley pole, a swivel cup provided with a concave spherical upturned bearing surface and disposed to be carried by said support member, a swivel provided with a convex spherical downturned bearing surface and mounted in said swivel cup with said bearing surfaces in engagement, and articulated sliding shoe means carried by said swivel and disposed to engage the conductor for collecting current therefrom.

5. A current collector for electric vehicles comprising, in combination, a support member disposed to be carried by a trolley pole, a swivel cup provided with an upturned bearing surface and slidably and pivotally mounted on said support member, resilient means interposed between said support member and said swivel cup for biasing them apart, a swivel provided with a downturned bearing surface and mounted in said swivel cup with said bearing surfaces in engagement, and a pair of independently movable slider shoes carried by said swivel and disposed to engage a conductor for collecting current therefrom.

6. A current collector for electric vehicles comprising, in combination, a support member disposed to be carried by a trolley pole, a swivel cup provided with an upturned bearing surface and disposed to be carried by said support member, a swivel provided with a downturned bearing surface and mounted in said swivel cup with said bearing surfaces in engagement, a pair of slider shoes having grooves for engaging a trolley wire to collect current therefrom slidably and pivotally mounted on said swivel, and resilient means interposed between said swivel and said slider shoes for biasing them apart.

7. A current collector for electric vehicles comprising, in combination, a support member disposed to be carried by a trolley pole, a swivel cup provided with an upturned bearing surface and slidably and pivotally mounted on said support member, resilient means interposed between said support member and said swivel cup for biasing them apart, a swivel provided with a downturned bearing surface and mounted in said swivel cup with said bearing surfaces in engagement, a pair of slider shoes having grooves for engaging a trolley wire to collect current therefrom slidably and pivotally mounted on said swivel, and resilient means interposed between said swivel and said slider shoes for biasing them apart.

8. A pole head for collecting current for an electric vehicle from a conductor comprising, in combination, a pole head support member disposed to be carried by a trolley pole, a swivel cup provided with a concave spherical upturned bearing surface and disposed to be carried by said support member, a swivel provided with a convex spherical downturned bearing surface and mounted in said swivel cup with said bearing surfaces in engagement, a pair of slider shoes having grooves for engaging a trolley wire to collect current therefrom slidably and pivotally mounted on said swivel, and resilient means interposed between said swivel and said slider shoes for biasing them apart.

9. A current collector for electric vehicles comprising, in combination, a support member disposed to be carried by a trolley pole, a swivel cup provided with an upturned bearing surface and disposed to be carried by said support member, a swivel provided with a downturned bearing surface and mounted in said swivel cup with said bearing surfaces in engagement, a cover plate secured to said swivel, a pair of slider shoes having grooves for engaging a trolley wire to collect current therefrom slidably and pivotally mounted on said cover plate, and a spring interposed between each of said shoes and said cover plate for biasing them apart.

10. A pole head for collecting current for an electric vehicle from a conductor comprising, in combination, a pole head support member disposed to be carried by a trolley pole, a swivel cup provided with a concave spherical upturned bearing surface and disposed to be carried by said support member, a swivel provided with a concave spherical downturned bearing surface and mounted in said swivel cup with said bearing surfaces in engagement, a cover plate secured to said swivel, a pair of slider shoes having grooves for engaging the conductor to collect current therefrom slidably and pivotally mounted on said cover plate, and a spring interposed between each of said shoes and said cover plate for biasing them apart.

11. A current collector for electric vehicles comprising, in combination, a support member disposed to be carried by a trolley pole, a swivel cup provided with an upturned bearing surface and slidably and pivotally mounted on said support member, resilient means interposed between said support member and said swivel cup for biasing them apart, a swivel provided with a downturned bearing surface and mounted in said swivel cup with said bearing surfaces in engagement, a cover plate secured to said swivel, a pair of slider shoes having grooves for engaging a trolley wire to collect current therefrom slidably and pivotally mounted on said cover plate, and a spring interposed between each of said shoes and said cover plate for biasing them apart.

12. A current collector for electric vehicles comprising, in combination, a support member disposed to be carried by a trolley pole, a swivel cup provided with an upturned bearing surface and disposed to be carried by said support member, a swivel provided with a downturned bearing surface and mounted in said swivel cup with said bearing surfaces in engagement, a pair of slider shoes having grooves for engaging a trolley wire to collect current therefrom slidably and pivotally mounted on said swivel, resilient means interposed between said swivel and said slider shoes for biasing them apart, and a flexible shunt electrically connecting said slider shoes to said swivel.

13. A pole head for collecting current for an electric vehicle from a conductor comprising, in combination, a pole head support member disposed to be carried by a trolley pole, a swivel cup provided with a concave spherical upturned bearing surface and disposed to be carried by said support member, a swivel provided with a convex spherical downturned bearing surface and mounted in said swivel cup with said bearing surfaces in engagement, a pair of slider shoes having grooves for engaging the conductor to collect current therefrom slidably and pivotally mounted on said swivel, resilient means interposed between said swivel and said slider shoes for biasing them apart, and a flexible shunt electrically connecting said slider shoes to said swivel.

14. A current collector for electric vehicles comprising, in combination, a support member disposed to be carried by a trolley pole, a swivel cup provided with an upturned bearing surface and slidably and pivotally mounted on said support member, resilient means interposed between said support member and said swivel cup for biasing them apart, a swivel provided with a downturned bearing surface and mounted in said swivel cup with said bearing surfaces in engagement, a pair of slider shoes having grooves for engaging a trolley wire to collect current therefrom slidably and pivotally mounted on said swivel, resilient means interposed between said swivel and said slider shoes for biasing them apart, and a flexible shunt electrically connecting said slider shoes to said swivel.

15. A pole head for collecting current for an electric vehicle from a conductor comprising, in combination, a pole head support member comprising a clamp member for attachment to a trolley pole and an apertured support cup integrally formed with said clamp member, a swivel cup provided with a concave spherical upturned bearing surface, a hollow depending spindle integrally formed with said swivel cup and projecting through the aperture in said support cup, a main spring interposed between said support cup and said swivel cup for biasing them apart, a swivel provided with a convex spherical downturned bearing surface and mounted in said swivel cup with said bearing surfaces in engagement, said swivel being provided with a slotted opening in the bottom thereof, a retaining bolt extending through the slotted opening in said swivel, said hollow spindle and said apertured support cup for limiting the relative movement of said parts under the influence of said main spring, a pair of slider shoes having grooves for engaging the conductor to collect current therefrom slidably and pivotally mounted on said swivel, resilient means interposed between said swivel and said slider shoes for biasing them apart, and a flexible shunt electrically connecting said slider shoes to said swivel.

WILLIAM SCHAAKE.